(12) United States Patent
Zhang et al.

(10) Patent No.: US 11,722,952 B2
(45) Date of Patent: Aug. 8, 2023

(54) JOINT CELL SELECTION AND BEAM/PATH LOSS REFERENCE SIGNAL UPDATE IN LAYER 1/LAYER 2 BASED MOBILITY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/247,538

(22) Filed: Dec. 15, 2020

(65) Prior Publication Data

US 2021/0195508 A1 Jun. 24, 2021

Related U.S. Application Data

(60) Provisional application No. 62/967,307, filed on Jan. 29, 2020, provisional application No. 62/961,536, filed on Jan. 15, 2020, provisional application No. 62/952,906, filed on Dec. 23, 2019.

(51) Int. Cl.
*H04B 7/08* (2006.01)
*H04W 48/16* (2009.01)
*H04W 48/20* (2009.01)

(52) U.S. Cl.
CPC ........... *H04W 48/16* (2013.01); *H04W 48/20* (2013.01)

(58) Field of Classification Search
CPC ...... H04W 48/16; H04W 48/20; H04B 7/088; H04B 7/0695
See application file for complete search history.

(56) References Cited

U.S. PATENT DOCUMENTS

| 2015/0024744 | A1 | 1/2015 | Yi et al. |
| 2019/0053175 | A1 | 2/2019 | Kubota et al. |
| 2019/0103908 | A1 | 4/2019 | Yu et al. |
| 2020/0196161 | A1* | 6/2020 | Ahn ................... H04W 56/001 |
| 2020/0351069 | A1 | 11/2020 | Grant et al. |
| 2020/0351798 | A1* | 11/2020 | Ji ......................... H04W 52/42 |
| 2021/0028828 | A1 | 1/2021 | Kurras et al. |

(Continued)

FOREIGN PATENT DOCUMENTS

| EP | 3876634 A1 * | 9/2021 | ........... H04B 17/373 |
| JP | 6978511 B2 * | 12/2021 | ........... H04B 7/0695 |

(Continued)

OTHER PUBLICATIONS

International Search Report and Written Opinion—PCT/US2020/070917—ISA/EPO—dated Feb. 17, 2021.

*Primary Examiner* — Said M Elnoubi
(74) *Attorney, Agent, or Firm* — Harrity & Harrity, LLP

(57) ABSTRACT

Various aspects of the present disclosure generally relate to wireless communication. In some aspects, a base station may identify a cell that has been selected for serving a user equipment (UE). The base station may provide a joint indication to the UE. The joint indication may include information associated with the cell that has been selected for serving the UE, information associated with one or more beams to be used for the cell, or information associated with one or more path loss reference signals to be used for the one or more beams. Numerous other aspects are provided.

34 Claims, 7 Drawing Sheets

(56) References Cited

U.S. PATENT DOCUMENTS

| | | |
|---|---|---|
| 2021/0058873 A1 | 2/2021 | Gao et al. |
| 2021/0159967 A1 | 5/2021 | Cirik et al. |
| 2021/0195570 A1 | 6/2021 | Zhang et al. |
| 2021/0251031 A1 | 8/2021 | Zhang et al. |
| 2021/0273699 A1 | 9/2021 | Cao |
| 2021/0329517 A1 | 10/2021 | Noh et al. |
| 2021/0391899 A1* | 12/2021 | Cao .................... H04B 17/373 |
| 2021/0409094 A1 | 12/2021 | Yuan et al. |

FOREIGN PATENT DOCUMENTS

| | | | |
|---|---|---|---|
| WO | 2019203711 A1 | 10/2019 | |
| WO | WO-2019203711 A * | 10/2019 | ............... H04B 7/06 |

* cited by examiner

JOINT CELL SELECTION AND BEAM/PATH LOSS REFERENCE SIGNAL UPDATE IN LAYER 1/LAYER 2 BASED MOBILITY

CROSS-REFERENCE TO RELATED APPLICATIONS

This Patent Application claims priority to U.S. Provisional Patent Application No. 62/952,906, filed on Dec. 23, 2019, entitled "JOINT CELL SELECTION AND BEAM/PATH LOSS REFERENCE SIGNAL UPDATE IN LAYER 1/LAYER 2 BASED MOBILITY," and assigned to the assignee hereof, to U.S. Provisional Patent Application No. 62/961,536, filed on Jan. 15, 2020, entitled "JOINT CELL SELECTION AND BEAM/PATH LOSS REFERENCE SIGNAL UPDATE IN LAYER 1/LAYER 2 BASED MOBILITY," and assigned to the assignee hereof, and to U.S. Provisional Patent Application No. 62/967,307, filed on Jan. 29, 2020, entitled "JOINT CELL SELECTION AND BEAM/PATH LOSS REFERENCE SIGNAL UPDATE IN LAYER 1/LAYER 2 BASED MOBILITY," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for joint cell selection and beam/path loss (PL) reference signal update in layer 1 (L1)/layer 2 (L2) based mobility.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include identifying a cell that has been selected for serving a UE; providing a joint indication to the UE, the joint indication including information associated with: the cell that has been selected for serving the UE one or more beams to be used for the cell, or one or more path loss (PL) reference signals to be used for the one or more beams.

In some aspects, a method of wireless communication, performed by a UE, may include receiving a joint indication from a base station, the joint indication including information associated with: a cell that has been selected for serving the UE, one or more beams to be used for the cell, or one or more PL reference signals to be used for the one or more beams; and communicating in the cell based at least in part on the joint indication.

In some aspects, a base station for wireless communication may include memory and one or more processors operatively coupled to the memory. The memory and the one or more processors may be configured to identify a cell that has been selected for serving a UE; provide a joint indication to the UE, the joint indication including information associated with: the cell that has been selected for serving the UE, one or more beams to be used for the cell, or one or more PL reference signals to be used for the one or more beams.

In some aspects, a UE for wireless communication may include memory and one or more processors operatively coupled to the memory. The memory and the one or more processors may be configured to receive a joint indication from a base station, the joint indication including information associated with: a cell that has been selected for serving the UE, one or more beams to be used for the cell, or one or more PL reference signals to be used for the one or more beams; and communicate in the cell based at least in part on the joint indication.

In some aspects, a non-transitory computer-readable medium may store one or more instructions for wireless communication. The one or more instructions, when executed by one or more processors of a base station, may cause the one or more processors to: identify a cell that has been selected for serving a UE; provide a joint indication to the UE, the joint indication including information associated with: the cell that has been selected for serving the UE, one or more beams to be used for the cell, or one or more PL reference signals to be used for the one or more beams.

In some aspects, a non-transitory computer-readable medium may store one or more instructions for wireless communication. The one or more instructions, when executed by one or more processors of a UE, may cause the one or more processors to: receive a joint indication from a base station, the joint indication including information associated with: a cell that has been selected for serving the UE, one or more beams to be used for the cell, or one or more PL reference signals to be used for the one or more beams; and communicate in the cell based at least in part on the joint indication.

In some aspects, an apparatus for wireless communication may include means for identifying a cell that has been selected for serving a UE; means for providing a joint indication to the UE, the joint indication including information associated with: the cell that has been selected for serving the UE, one or more beams to be used for the cell, or one or more PL reference signals to be used for the one or more beams.

In some aspects, an apparatus for wireless communication may include means for receiving a joint indication from a base station, the joint indication including information associated with: a cell that has been selected for serving the apparatus, one or more beams to be used for the cell, or one or more PL reference signals to be used for the one or more beams; and means for communicating in the cell based at least in part on the joint indication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
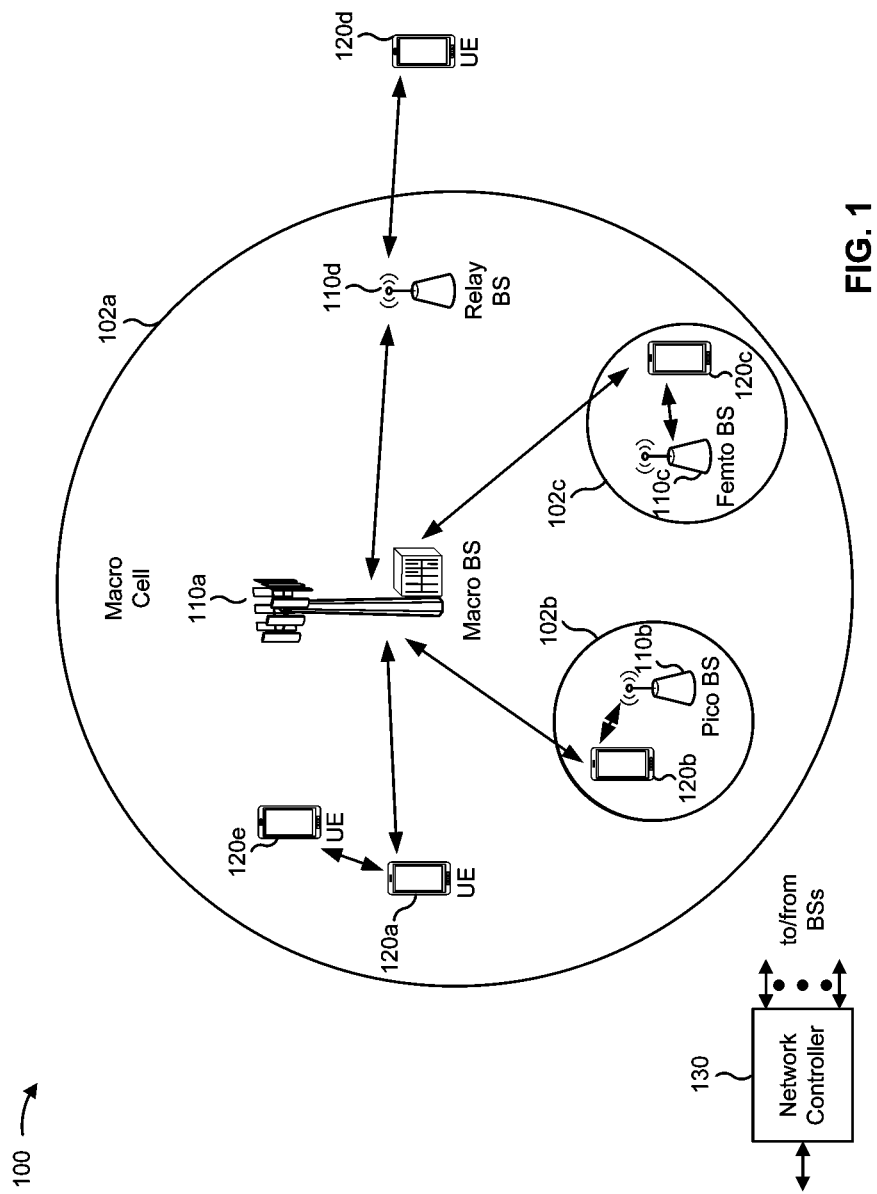
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a wireless communication device of FIG. 1 (e.g., base station 110, UE 120, network controller 130, and/or the like) may perform one or more operations associated with joint cell selection and beam and/or PL reference signal (hereinafter beam/PL reference signal) update in L1 and/or L2 (hereinafter L1/L2) based mobility, as described herein. For example, a base station 110 may identify a cell that has been selected for serving a UE 120, and may provide a joint indication to the UE, the joint indication including information associated with the cell that has been selected for serving the UE, information associated with one or more beams to be used for the cell, and/or information associated with one or more PL reference signals to be used for the one or more beams. Here, the UE 120 may receive the joint indication from the base station, and may communicate in the cell based at least in part on the joint indication (e.g., based at least in part on the information associated with the cell and the information associated with at least one of one or more beams to be used for the cell or one or more PL reference signals to be used for the one or more beams).

As indicated above, FIG. 1 is provided as an example. Other examples may differ from what is described with regard to FIG. 1.

Figure 2:
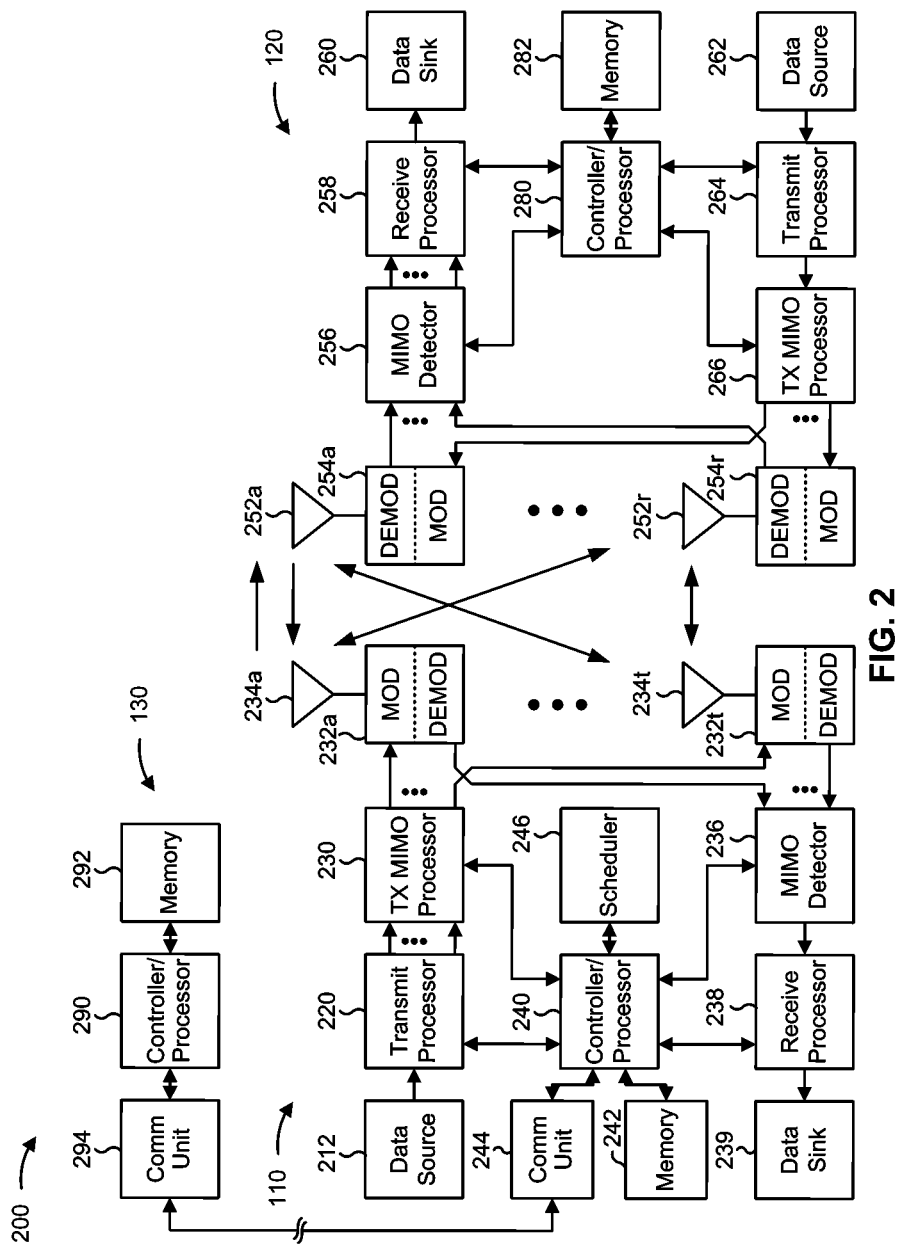
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with joint cell selection and beam/PL reference signal update in L1/L2 based mobility, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, base station 110 may include means for identifying a cell that has been selected for serving a UE 120; means for providing a joint indication to a UE 120, the joint indication including information associated with: the cell that has been selected for serving the UE 120, one or more beams to be used for the cell, or one or more PL reference signals to be used for the one or more beams; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving a joint indication from a base station 110, the joint indication including information associated with: a cell that has been selected for serving the UE 120 one or more beams to be used for the cell, or one or more PL reference signals to be used for the one or more beams; means for communicating in the cell based at least in part on the joint indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some wireless communication systems, such as an NR system, a set of mechanisms by which UEs and base stations establish directional links (e.g., using high-dimensional phased arrays) may be useful (e.g., to benefit from beamforming gain and/or to maintain acceptable communication quality). Such directional links, however, require fine alignment of transmit and receive beams. This alignment may be achieved through a set of operations referred to as beam management.

Further, a wireless communication system may support multi-beam operation in a relatively high carrier frequency (e.g., within Frequency Range 2 (FR2)). In such cases, the higher carrier frequency makes propagation conditions harsher than at a comparatively lower carrier frequency. For example, signals propagating in a millimeter wave band may suffer from increased pathloss and severe channel intermittency, and/or may be blocked by objects commonly present in an environment of the UE (e.g., a building, a tree, a body of a user, and/or the like), as compared to a sub-6 gigahertz (GHz) band. As a result, beam management is of particular importance for multi-beam operation in a relatively high carrier frequency.

One possible enhancement for multi-beam operation in a higher carrier frequency is facilitation of efficient (e.g., low latency and low overhead) beam management to support higher L1/L2-centric inter-cell mobility. L1/L2-centric inter-cell mobility may be used when, for example, a multi-beam UE operating in FR2 moves from one or more first cells to one or more second cells. Notably, such cell switching may be used regularly due to operation in FR2. Numerous operation modes of L1/L2-centric inter-cell mobility have been proposed. One goal for L1/L2-centric inter-cell mobility is to enable a UE to perform a cell switch via a lower layer (e.g., L1 and/or L2) rather than a higher layer, which increases efficiency of the cell switch (e.g., by reducing latency and overhead).

In an L1/L2-centric inter-cell mobility scenario with multi-beam operation, when a base station selects a cell for serving a UE, the base station indicates the selected cell to the UE. Further, the base station may signal information associated with operation in the cell, such as information associated with one or more beams (e.g., one or more downlink beams and/or one or more uplink beams) to be used for the cell and/or information associated with one or more path loss (PL) reference signals to be used (e.g., for uplink power control) for the cell. Currently, the base station indicates the selected cell, the information associated with the one or more beams, and the information associated with the one or more PL reference signals separately (e.g., the base station may provide first downlink control information (DCI) for indicating cell selection, second DCI for beam update/activation, and third DCI for PL reference signal activation). However, communication of such information in multiple transmissions is inefficient (e.g., in terms of, for example, latency and signaling overhead, which is particularly undesirable in an L1/L2-centric inter-cell mobility scenario).

Some aspects described herein provide techniques and apparatuses for joint cell selection and beam/PL reference signal updating in L1/L2 based mobility. In some aspects, a base station may provide, and a UE may receive, a joint indication including information associated with a cell that has been selected for serving the UE, and information associated with at least one of one or more beams to be used for the cell, or one or more PL reference signals to be used for the one or more beams. In some aspects, such joint indication may improve efficiency of cell switching via a lower layer (e.g., L1 and/or L2) by reducing latency and/or overhead.

Figure 3:
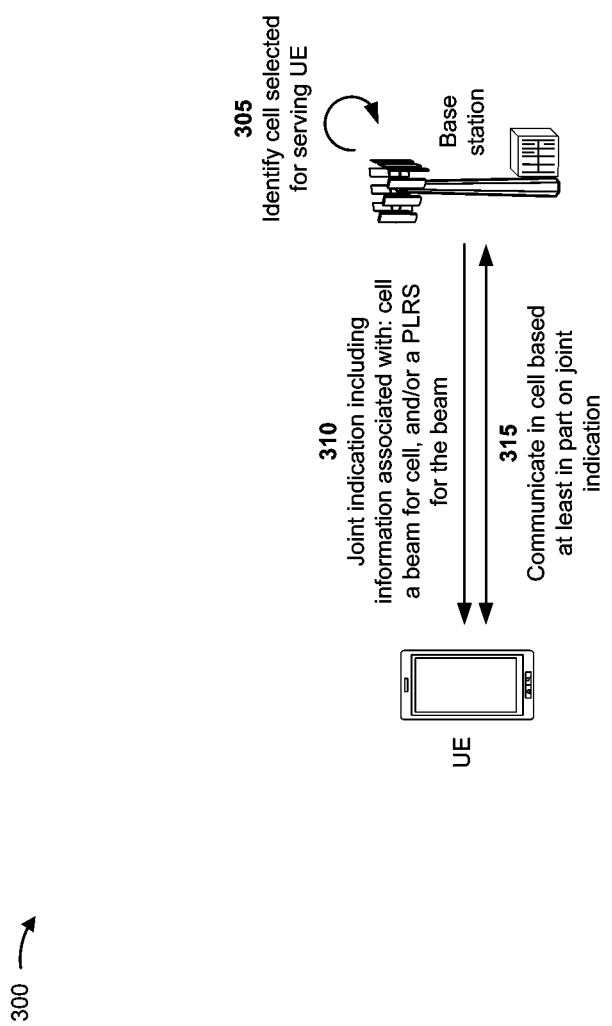
FIG. 3 is a diagram of an example associated with joint cell selection and beam/PL reference signal updating in L1/L2 based mobility, in accordance with various aspects of the present disclosure.

FIG. 3 is a diagram of an example associated with joint cell selection and beam/PL reference signal updating in L1/L2 based mobility, in accordance with various aspects of the present disclosure.

As shown by reference 305, a base station (e.g., base station 110) may identify (e.g., using receive processor 238, controller/processor 240, memory 242, identification component 608, and/or the like) a cell that has been selected for serving a UE (e.g., UE 120). In some aspects, the base station may identify the cell that has been selected for serving the UE based at least in part on a cell selection/deselection performed by the base station. For example, in some aspects, the base station may select or deselect a given cell for serving the UE based on a reference signal received power (RSRP) associated with the given cell (e.g., an RSRP per reported synchronization signal block (SSB) identifier, an RSRP per reported SSB identifier per physical cell identifier (PCI), and/or the like). Here, when the base station selects the given cell for serving the UE, the base station may identify the given cell as a cell selected for serving the UE. Alternatively, in some aspects, the base station may identify the cell that has been selected for serving the UE based at least in part on an indication received from the UE (e.g., when the UE performs cell selection/deselection and provides an indication of a plurality of selected/deselected cells to the base station). In some aspects, the base station may identify one or more additional cells selected for serving the UE in this manner. That is, in some aspects, the base station may identify multiple cells selected for serving the UE.

In some aspects, the manner in which the cell is identified for serving the UE may depend on an operation mode of L1/L2-centric inter-cell mobility. A first example of an operation mode may include a mode of operation in which each serving cell has one physical cell identifier (PCI) and can have multiple physical cell sites (e.g., remote radio headers (RRH)). Here, each RRH may transmit a different set of synchronization signal block (SSB) identifiers, but with a same PCI for the serving cell. In this operation mode, downlink control information (DCI) or a medium access control control element (MAC-CE) can indicate one or more RRHs or corresponding SSBs selected to serve the UE based at least in part on a RSRP per reported SSB identifier. A second example of an operation mode includes a mode of operation in which each serving cell can be configured with multiple PCIs, and each RRH of the serving cell can use one PCI configured for the serving cell and can transmit a full set of SSB identifiers. Here, DCI or a MAC-CE can indicate one or more RRHs or one or more corresponding PCIs and/or SSBs selected to serve the UE based at least in part on a RSRP per reported SSB identifier per reported PCI. A third example of an operation mode may include a mode of operation mode in which each serving cell has one PCI. Here, DCI or a MAC-CE can indicate one or more serving cells or corresponding serving cell identifiers selected to serve the UE based on a RSRP per reported SSB identifier per reported PCI. Notably, while SSBs are described in the above examples, an SSB can be another type of cell-defining reference signal (e.g., a channel state information reference signal (CSI-RS), positioning reference signal (PRS), and/or the like).

As shown by reference 310, the base station may provide (e.g., using transmit processor 220, controller/processor 240, memory 242, transmission component 604, and/or the like) a joint indication including information associated with the cell that has been selected for serving the UE. Here, the joint indication further includes information associated with one or more beams to be used for the cell and/or information associated with one or more PL reference signals to be used for the one or more beams (e.g., for uplink power control). In some aspects, the joint indication may include information associated with multiple cells selected for serving the UE (e.g., when the base station identifies multiple cells selected for serving the UE).

As indicated by reference 310, the UE may receive (e.g., using receive processor 258, controller/processor 280, memory 282, reception component 702, and/or the like) the joint indication provided by the base station. In some aspects, the base station may provide, and the UE may receive, the joint indication via downlink control information (DCI), a medium access control control element (MAC-CE), and/or the like.

In some aspects, the information associated with a given cell, included in the joint indication, may include information identifying the cell. The information identifying the cell may include, for example, a physical cell identifier (PCI), a serving cell identifier, and/or the like.

In some aspects, when the joint indication includes information associated with the one or more beams to be used for the cell, a downlink beam may be indicated by an activated transmission configuration indicator (TCI) state identifier included in the joint indication. In some aspects, the downlink beam may be a beam that is to be used for a physical downlink control channel (PDCCH), and the activated TCI state identifier may be associated with a control resource set (CORESET) identifier. That is, for a PDCCH, the beam may be indicated by an activated TCI state identifier per CORESET identifier, in some aspects. In some aspects, the downlink beam may be a beam that is to be used for a physical downlink shared channel (PDSCH). That is, for PDSCH, the beam can be indicated by an activated TCI state identifier for PDSCH, in some aspects. In some aspects, the downlink beam may be a beam that is to be used for a default PDSCH beam. A default PDSCH beam may be used when a scheduling offset between DCI and a scheduled PDSCH is less than a beam switch latency threshold. That is, for a default PDSCH, the beam can be indicated by an activated TCI state identifier, in some aspects.

In some aspects, when the joint indication includes the information associated with the one or more beams to be used for the cell, an uplink beam may be indicated by activated spatial relation information associated with an uplink resource. In some aspects, the uplink beam may be a beam that is to be used for a physical uplink control channel (PUCCH) or a sounding reference signal (SRS). That is, for PUCCH/SRS, the beam can be indicated by activated spatial relation information per PUCCH/SRS resource, in some aspects.

In some aspects, when the joint indication includes the information associated with the one or more beams to be used for the cell, an uplink beam may be indicated by an activated uplink TCI state identifier. In some aspects, the uplink beam may be a beam that is to be used for a PUCCH, an SRS, a physical uplink shared channel (PUSCH), or a physical random access channel (PRACH). That is, for PUCCH/SRS/PUSCH/PRACH, the beam can be indicated by an activated uplink TCI state identifier, in some aspects.

In some aspects, when the joint indication includes the information associated with the one or more PL reference signals to be used for the one or more beams, PL reference signal identifiers may be indicated per PUCCH resource identifier. That is, a PL reference signal identifier can be indicated per PUCCH resource identifier, in some aspects.

In some aspects, when the joint indication includes the information associated with the one or more PL reference signals to be used for the one or more beams, PL reference signal identifiers may be indicated per SRS resource set identifier. That is, a PL reference signal identifier can be indicated per SRS resource set identifier, in some aspects.

In some aspects, when the joint indication includes the information associated with the one or more PL reference signals to be used for the one or more beams, PL reference signal identifiers may be indicated per PUSCH. That is, a PL reference signal identifier can be indicated per PUSCH transmission, in some aspects.

In some aspects, when the joint indication includes the information associated with the one or more PL reference signals to be used for the one or more beams, PL reference signal identifiers may be indicated per SRS resource indicator (SRI). That is, a PL reference signal identifier can be indicated per SRI associated with a PUSCH transmission, in some aspects.

In some aspects, the cell selected for serving the UE is a first cell selected for serving the UE, and information included in the joint indication (e.g., the information associated with the one or more beams and/or the information associated with the one or more PL reference signals) may be information that is to be used for a second cell that has been selected for serving the UE. That is, the one or more beams (e.g., one or more downlink beams and/or one or more uplink beams) and/or the one or more PL reference signals indicated by the joint indication can, in some aspects, be applied to multiple cells selected for serving the UE.

In some aspects, the information included in the joint indication may be used by the second cell based at least in part on the first cell and the second cell being included on a cell list that is pre-configured on the UE. For example, in some aspects, multiple cell lists may pre-configured on the UE. Here, when the one or more beams and/or the one or more PL reference signals are indicated to be used for a first cell on a given cell list of the multiple pre-configured cell lists, the same one or more beams and/or one or more PL reference signals can be applied to other selected cells in the given cell list. More specifically, the same indicated identifier of TCI state, spatial relation, uplink TCI state, and/or PL reference signal can be applied to the same indicated identifier of CORESET, PUCCH resource, and/or SRS resource set, or can be applied to the same indicated usage of PDSCH or PUSCH transmission, on other selected cells in the same cell list.

In some aspects, the information included in the joint indication may be used by the second cell based at least in part on the first cell and the second cell being included on a list of selected cells identifying the first cell and the second cell. In some aspects, the list of selected cells may be communicated to the UE via the joint indication, DCI, a MAC-CE, and/or the like. That is, the one or more beams and/or the one or more PL reference signals can be indicated to be used for a list of selected cells, in some aspects.

In some aspects, the information included in the joint indication may be used by the second cell based at least in part on the first cell and the second cell being included in a cell group including the first cell and the second cell. In some aspects, information that identifies the cell group (e.g., a cell group identifier) may be communicated to the UE via the joint indication, DCI, a MAC-CE, and/or the like. That is, the one or more beams and/or the one or more PL reference signals can be indicated to be used for selected cells included in an identified cell group, in some aspects.

In some aspects, the second cell for serving the UE may be identified based at least in part on a UE capability indicating whether the UE supports cells in which a frequency range is permitted to share a same beam or a same PL reference signal.

As shown by reference 315, the UE may communicate (e.g., using receive processor 258, transmit processor 264, controller/processor 280, memory 282, reception component 702, transmission component 704, and/or the like) in the cell based at least in part on the joint indication. For example, the UE may receive one or more communications (e.g., a PUCCH communication, a PUSCH communication, an SRS, a PRACH communication, and/or the like) based at least in part on information associated with one or more beams included in the joint indication. As another example, the UE may transmit one or more communications (e.g., a PDSCH communication, a PDCCH communication) based at least in part on information associated with one or more beams included in the joint indication. As another example, the UE may receive one or more PL reference signals based at least in part on information associated with one or more PL reference signal to be used for the cell included in the joint indication. In some aspects, the cell in which the UE communicates based at least in part on the joint indication may be the same cell as that in which the joint indication was provided to the UE. Alternatively, in some aspects, the cell in which the UE communicates based at least in part on the joint indication may be a different cell from that in which the joint indication was provided to the UE.

As indicated above, FIG. 3 is provided as an example. Other examples may differ from what is described with regard to FIG. 3.

Figure 4:
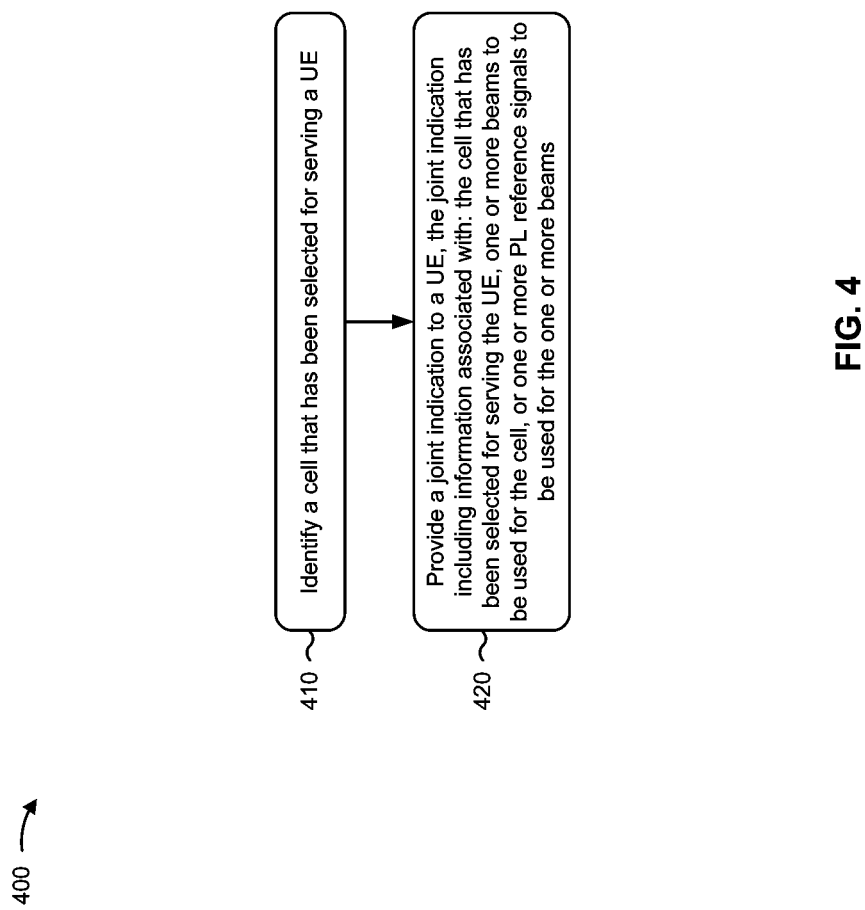
FIG. 4 is a diagram illustrating an example process performed, for example, by a base station, in accordance with various aspects of the present disclosure.

FIG. 4 is a diagram illustrating an example process 400 performed, for example, by a base station, in accordance with various aspects of the present disclosure. Example process 400 is an example where the base station (e.g., base station 110 and/or the like) performs operations associated with joint cell selection and beam/PL reference signal update in L1/L2 based mobility.

As shown in FIG. 4, in some aspects, process 400 may include identifying a cell that has been selected for serving a UE (block 410). For example, the base station (e.g., using transmit processor 220, receive processor 238, controller/processor 240, memory 242, identification component 608, and/or the like) may identify a cell that has been selected for serving a UE (e.g., UE 120), as described above. In some aspects, the base station may identify the cell that has been selected for serving the UE in a manner similar to that described above in association with reference 305 of FIG. 3.

As further shown in FIG. 4, in some aspects, process 400 may include providing a joint indication to the UE, the joint indication including information associated with: the cell that has been selected for serving the UE, one or more beams to be used for the cell, or one or more PL reference signals to be used for the one or more beams (block 420). For example, the base station (e.g., using transmit processor 220, controller/processor 240, memory 242, transmission component 604, and/or the like) may provide a joint indication to the UE, the joint indication including information associated with: the cell that has been selected for serving the UE, one or more beams to be used for the cell, or one or more PL reference signals to be used for the one or more beams, as described above. In some aspects, the base station may provide the joint indication in a manner similar to that described above in association with reference 310 of FIG. 3.

Process 400 may include additional aspects, such as any single aspect or any combination of aspects described below and/or in connection with one or more other processes described elsewhere herein.

In a first aspect, the joint indication is provided via downlink control information. In a second aspect, alone or in combination with the first aspect, the joint indication is provided via a medium access control control element.

In a third aspect, alone or in combination with one or more of the first and second aspects, the information associated with the cell includes information identifying the cell.

In a fourth aspect, alone or in combination with one or more of the first through third aspects, the information identifying the cell includes a physical cell identifier or a serving cell identifier.

In a fifth aspect, alone or in combination with one or more of the first through fourth aspects, the one or more beams include a downlink beam indicated by an activated transmission configuration indicator (TCI) state identifier.

In a sixth aspect, alone or in combination with one or more of the first through fifth aspects, the downlink beam is to be used for a physical downlink control channel, and the activated TCI state identifier is associated with a control resource set identifier.

In a seventh aspect, alone or in combination with one or more of the first through sixth aspects, the downlink beam is to be used for a physical downlink shared channel.

In an eighth aspect, alone or in combination with one or more of the first through seventh aspects, the downlink beam is to be used for a default physical downlink shared channel (PDSCH) to be used when a scheduling offset between downlink control information and a scheduled PDSCH is less than a beam switch latency threshold.

In a ninth aspect, alone or in combination with one or more of the first through eighth aspects, the one or more beams include an uplink beam indicated by activated spatial relation information associated with an uplink resource.

In a tenth aspect, alone or in combination with one or more of the first through ninth aspects, the uplink beam is to be used for a physical uplink control channel or a sounding reference signal.

In an eleventh aspect, alone or in combination with one or more of the first through tenth aspects the one or more beams include an uplink beam indicated by an activated uplink transmission configuration indicator state identifier.

In a twelfth aspect, alone or in combination with one or more of the first through eleventh aspects, the uplink beam is to be used for a physical uplink control channel, a sounding reference signal, a physical uplink shared channel, or a physical random access channel.

In a thirteenth aspect, alone or in combination with one or more of the first through twelfth aspects PL reference signal identifiers associated with the one or more PL reference signals are indicated per physical uplink control channel resource identifier.

In a fourteenth aspect, alone or in combination with one or more of the first through thirteenth aspects PL reference signal identifiers associated with the one or more PL reference signals are indicated per sounding reference signal resource set identifier.

In a fifteenth aspect, alone or in combination with one or more of the first through fourteenth aspects PL reference signal identifiers associated with the one or more PL reference signals are indicated per physical uplink shared channel transmission.

In a sixteenth aspect, alone or in combination with one or more of the first through fifteenth aspects PL reference signal identifiers associated with the one or more PL reference signals are indicated per sounding reference signal resource indicator.

In a seventeenth aspect, alone or in combination with one or more of the first through sixteenth aspects, the cell is a first cell, and the information associated with the one or more beams or the information associated with the one or more PL reference signals is to be used for a second cell that has been selected for serving the UE.

In an eighteenth aspect, alone or in combination with one or more of the first through seventeenth aspects, the information associated with the one or more beams or the information associated with the one or more PL reference signals is to be used by the second cell based at least in part on the first cell and the second cell being included on a same cell list.

In a nineteenth aspect, alone or in combination with one or more of the first through eighteenth aspects, the cell list is one of a set of cell lists that is pre-configured on the UE.

In a twentieth aspect, alone or in combination with one or more of the first through nineteenth aspects, a cell list identifying the first cell and the second cell is provided to the UE via at least one of: the joint indication, downlink control information; or a medium access control control element.

In a twenty-first aspect, alone or in combination with one or more of the first through twentieth aspects, a cell group identifier of a cell group including the first cell and the second cell is provided to the UE via at least one of: the joint indication, downlink control information; or a medium access control control element.

In a twenty-second aspect, alone or in combination with one or more of the first through twenty-first aspects, the second cell is identified based at least in part on a UE capability indicating whether the UE supports cells in which a frequency range is permitted to share a same beam or a same PL reference signal.

In a twenty-third aspect, alone or in combination with one or more of the first through twenty-second aspects, the information associated with the one or more PL reference signals includes at least one PL reference signal identifier.

In a twenty-fourth aspect, in combination with the twenty-third aspect, the at least one PL reference signal identifier is indicated together with the one or more beams beam associated with a resource.

In a twenty-fifth aspect, in combination with the twenty-fourth aspect, the resource includes at least one among a physical uplink control channel, a sounding reference signal, a physical uplink shared channel, or a physical random access channel.

In a twenty-sixth aspect, in combination with the twenty-fifth aspect, the one or more beams are provided by one among a sounding reference signal resource indicator or an activated uplink transmission configuration indicator state identifier.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
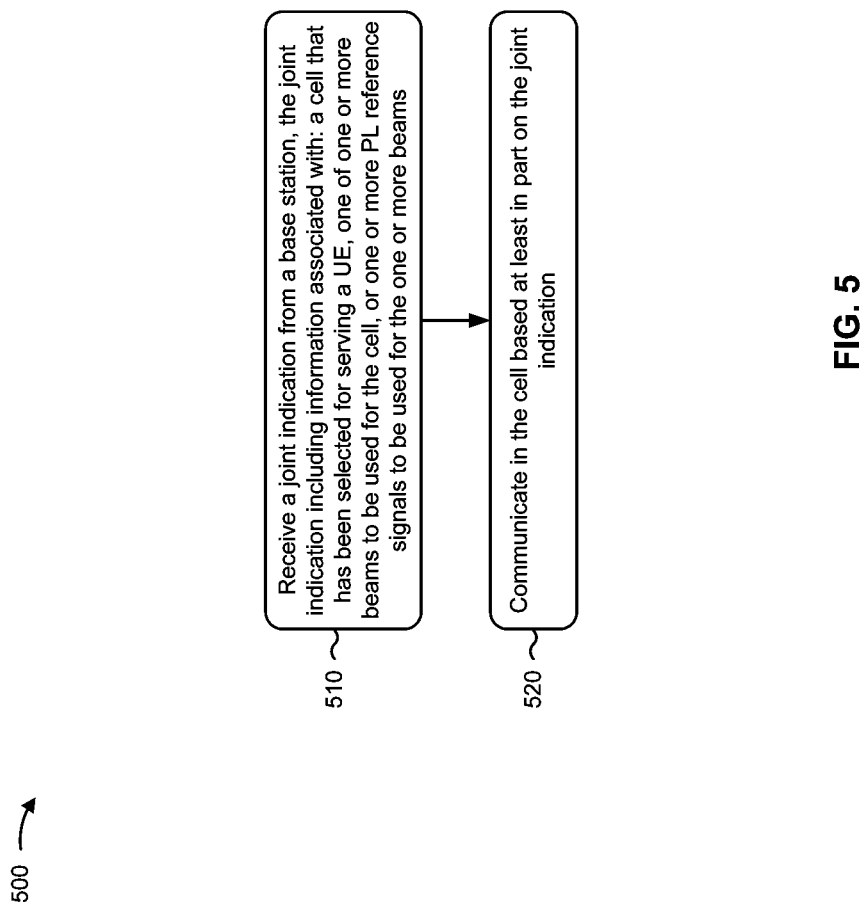
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with joint cell selection and beam/PL reference signal update in L1/L2 based mobility.

As shown in FIG. 5, in some aspects, process 500 may include receiving a joint indication from a base station, the joint indication including information associated with: a cell that has been selected for serving the UE, one or more beams to be used for the cell, or one or more PL reference signals to be used for the one or more beams (block 510). For example, the UE (e.g., using receive processor 258, controller/processor 280, memory 282, reception component 702, and/or the like) may receive a joint indication from a base station (e.g., a base stat 110), the joint indication including information associated with: a cell that has been selected for serving the UE one or more beams to be used for the cell, or one or more PL reference signals to be used for the one or more beams, as described above. In some aspects, the UE may receive the joint indication in a manner similar to that described above in association with reference 310 of FIG. 3.

As further shown in FIG. 5, in some aspects, process 500 may include communicating in the cell based at least in part on the joint indication (block 520). For example, the UE (e.g., using receive processor 258, transmit processor 264, controller/processor 280, memory 282, reception component 702, transmission component 704, and/or the like) may communicate in the cell based at least in part on the joint indication, as described above. In some aspects, the UE may communicate in the cell based at least in part on the joint indication in a manner similar to that described above in association with reference 315 of FIG. 3.

Process 500 may include additional aspects, such as any single aspect or any combination of aspects described below and/or in connection with one or more other processes described elsewhere herein.

In a first aspect, the joint indication is received via downlink control information. In a second aspect, alone or in combination with the first aspect, the joint indication is received via a medium access control control element.

In a third aspect, alone or in combination with one or more of the first and second aspects, the information associated with the cell includes information identifying the cell.

In a fourth aspect, alone or in combination with one or more of the first through third aspects, the information identifying the cell includes a physical cell identifier or a serving cell identifier.

In a fifth aspect, alone or in combination with one or more of the first through fourth aspects the one or more beams include a downlink beam indicated by an activated TCI state identifier.

In a sixth aspect, alone or in combination with one or more of the first through fifth aspects, the downlink beam is to be used for a physical downlink control channel, and the activated TCI state identifier is associated with a control resource set identifier.

In a seventh aspect, alone or in combination with one or more of the first through sixth aspects, the downlink beam is to be used for a physical downlink shared channel.

In an eighth aspect, alone or in combination with one or more of the first through seventh aspects, the downlink beam is to be used for a default PDSCH to be used when a scheduling offset between downlink control information and a scheduled PDSCH is less than a beam switch latency threshold.

In a ninth aspect, alone or in combination with one or more of the first through eighth aspects, the one or more beams include an uplink beam indicated by activated spatial relation information associated with an uplink resource.

In a tenth aspect, alone or in combination with one or more of the first through ninth aspects, the uplink beam is to be used for a physical uplink control channel or a sounding reference signal.

In an eleventh aspect, alone or in combination with one or more of the first through tenth aspects the one or more beams include an uplink beam is indicated by an activated uplink transmission configuration indicator state identifier.

In a twelfth aspect, alone or in combination with one or more of the first through eleventh aspects, the uplink beam is to be used for a physical uplink control channel, a sounding reference signal, a physical uplink shared channel, or a physical random access channel.

In a thirteenth aspect, alone or in combination with one or more of the first through twelfth aspects PL reference signal identifiers associated with the one or more PL reference signals are indicated per physical uplink control channel resource identifier.

In a fourteenth aspect, alone or in combination with one or more of the first through thirteenth aspects PL reference signal identifiers associated with the one or more PL reference signals are indicated per sounding reference signal resource set identifier.

In a fifteenth aspect, alone or in combination with one or more of the first through fourteenth aspects PL reference signal identifiers associated with the one or more PL reference signals are indicated per physical uplink shared channel transmission.

In a sixteenth aspect, alone or in combination with one or more of the first through fifteenth aspects PL reference signal identifiers associated with the one or more PL reference signals are indicated per sounding reference signal resource indicator.

In a seventeenth aspect, alone or in combination with one or more of the first through sixteenth aspects, the cell is a first cell, and the information associated with the one or more beams or the information associated with the one or more PL reference signals is to be used for a second cell that has been selected for serving the UE.

In an eighteenth aspect, alone or in combination with one or more of the first through seventeenth aspects, the information associated with the one or more beams or the information associated with the one or more PL reference signals is to be used by the second cell based at least in part on the first cell and the second cell being included on a same cell list.

In a nineteenth aspect, alone or in combination with one or more of the first through eighteenth aspects, the cell list is one of a set of cell lists that is pre-configured on the UE.

In a twentieth aspect, alone or in combination with one or more of the first through nineteenth aspects, a cell list identifying the first cell and the second cell is received via at least one of: the joint indication, downlink control information; or a medium access control control element.

In a twenty-first aspect, alone or in combination with one or more of the first through twentieth aspects, a cell group identifier of a cell group including the first cell and the second cell is provided received via at least one of: the joint indication, downlink control information; or a medium access control control element.

In a twenty-second aspect, alone or in combination with one or more of the first through twenty-first aspects, the second cell is identified based at least in part on a UE capability indicating whether the UE supports cells in which a frequency range is permitted to share a same beam or a same PL reference signal.

In a twenty-third aspect, alone or in combination with one or more of the first through twenty-second aspects, the information associated with the one or more PL reference signals includes at least one PL reference signal identifier.

In a twenty-fourth aspect, in combination with the twenty-third aspect, the at least one PL reference signal identifier is indicated together with the one or more beams beam associated with a resource.

In a twenty-fifth aspect, in combination with the twenty-fourth aspect, the resource includes at least one among a physical uplink control channel, a sounding reference signal, a physical uplink shared channel, or a physical random access channel.

In a twenty-sixth aspect, in combination with the twenty-fifth aspect, the one or more beams are provided by one among a sounding reference signal resource indicator or an activated uplink transmission configuration indicator state identifier.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
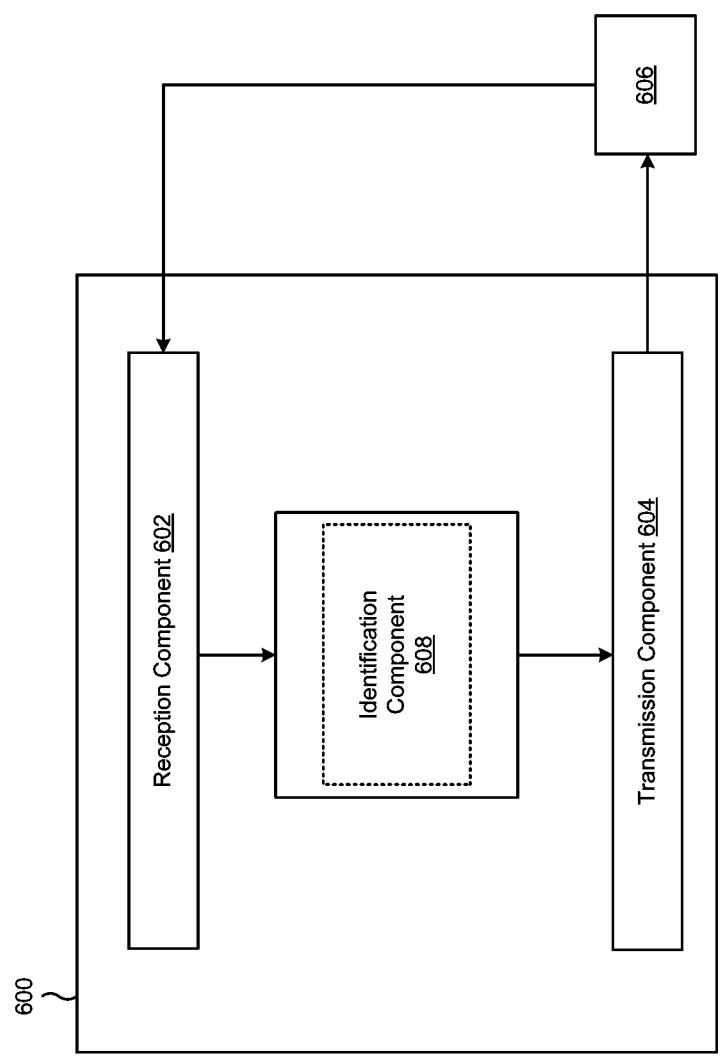
FIGS. 6 and 7 are block diagrams of example apparatuses for wireless communication, in accordance with various aspects of the present disclosure.

FIG. 6 is a block diagram of an example apparatus 600 for wireless communication. The apparatus 600 may be a base station, or a base station may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include an identification component 608, among other examples.

In some aspects, the apparatus 600 may be configured to perform one or more operations described herein in connection with FIG. 3. Additionally or alternatively, the apparatus 600 may be configured to perform one or more processes described herein, such as process 400 of FIG. 4. In some aspects, the apparatus 600 and/or one or more components shown in FIG. 6 may include one or more components of the base station described above in connection with FIG. 2. Additionally, or alternatively, one or more components shown in FIG. 6 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the base station described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the base station described above in connection with FIG. 2. In some aspects, the transmission component 604 may be co-located with the reception component 602 in a transceiver.

The identification component 608 may identify a cell that has been selected for serving a UE. In some aspects, the identification component 608 may include one or more antennas, a demodulator, a MIMO detector, a receive processor, a modulator, a transmit MIMO processor, a transmit processor, a controller/processor, a memory, or a combination thereof, of the base station described above in connection with FIG. 2. In some aspects, the transmission component 604 may provide a joint indication to the UE, the joint indication including information associated with the cell that has been selected for serving the UE, information associated with one or more beams to be used for the cell, and/or information associated with one or more PL reference signals to be used for the one or more beams.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
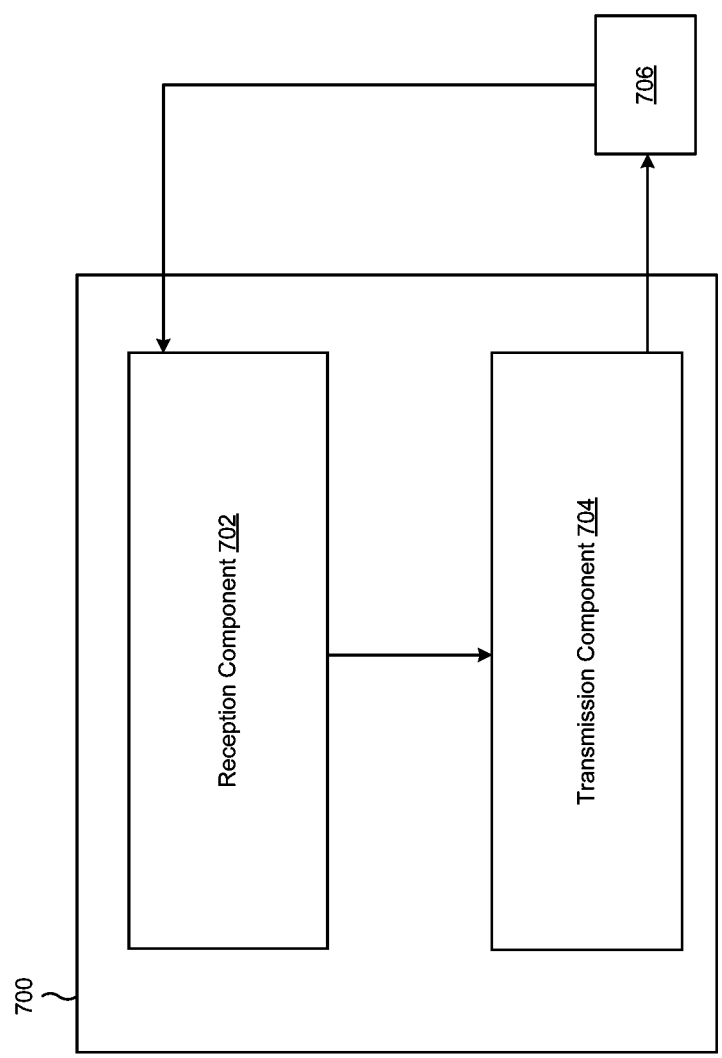

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 3. Additionally or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

In some aspects, the reception component 702 may receive a joint indication from a base station, the joint indication including information associated with a cell that has been selected for serving the UE, information associated with one or more beams to be used for the cell, and/or information associated with one or more PL reference signals to be used for the one or more beams. The reception component 702 and/or the transmission component 704 may communicate in the cell based at least in part on the joint indication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some aspects of the present disclosure:

Aspect 1: A method of wireless communication performed by a base station, comprising: identifying a cell that has been selected for serving a user equipment (UE); and providing a joint indication to the UE, the joint indication including information associated with: the cell that has been selected for serving the UE, one or more beams to be used for the cell, or one or more path loss (PL) reference signals to be used for the one or more beams.

Aspect 2: The method of aspect 1, wherein the joint indication is provided via downlink control information.

Aspect 3: The method of any of aspects 1-2, wherein the joint indication is provided via a medium access control control element.

Aspect 4: The method of any of aspects 1-3, wherein the information associated with the cell includes information identifying the cell.

Aspect 5: The method of aspect 4, wherein the information identifying the cell includes a physical cell identifier or a serving cell identifier.

Aspect 6: The method of any of aspects 1-5, wherein the one or more beams include a downlink beam indicated by an activated transmission configuration indicator (TCI) state identifier.

Aspect 7: The method of aspect 6, wherein the downlink beam is to be used for a physical downlink control channel, and the activated TCI state identifier is associated with a control resource set identifier.

Aspect 8: The method of aspect 6, wherein the downlink beam is to be used for a physical downlink shared channel.

Aspect 9: The method of aspect 6, wherein the downlink beam is to be used for a default physical downlink shared channel (PDSCH) to be used when a scheduling offset between downlink control information and a scheduled PDSCH is less than a beam switch latency threshold.

Aspect 10: The method of any of aspects 1-9, wherein the one or more beams include an uplink beam indicated by activated spatial relation information associated with an uplink resource.

Aspect 11: The method of aspect 10, wherein the uplink beam is to be used for a physical uplink control channel or a sounding reference signal.

Aspect 12: The method of any of aspects 1-11, wherein the one or more beams include an uplink beam indicated by an activated uplink transmission configuration indicator state identifier.

Aspect 13: The method of aspect 12, wherein the uplink beam is to be used for a physical uplink control channel, a sounding reference signal, a physical uplink shared channel, or a physical random access channel.

Aspect 14: The method of any of aspects 1-13, wherein the information associated with the one or more PL reference signals includes at least one PL reference signal identifier.

Aspect 15: The method of aspect 14, wherein the at least one PL reference signal identifier is indicated together with the one or more beams beam associated with a resource.

Aspect 16: The method of aspect 15, wherein the resource includes at least one among a physical uplink control channel, a sounding reference signal, a physical uplink shared channel, or a physical random access channel.

Aspect 17: The method of aspect 16, wherein the one or more beams are provided by one among a sounding reference signal resource indicator or an activated uplink transmission configuration indicator state identifier.

Aspect 18: The method of any of aspects 1-17, wherein PL reference signal identifiers associated with the one or more PL reference signals are indicated per physical uplink control channel resource identifier.

Aspect 19: The method of any of aspects 1-18, wherein PL reference signal identifiers associated with the one or more PL reference signals are indicated per sounding reference signal resource set identifier.

Aspect 20: The method of any of aspects 1-19, wherein PL reference signal identifiers associated with the one or more PL reference signals are indicated per physical uplink shared channel transmission.

Aspect 21: The method of any of aspects 1-20, wherein PL reference signal identifiers associated with the one or more PL reference signals are indicated per sounding reference signal resource indicator.

Aspect 22: The method of any of aspects 1-21, wherein the cell is a first cell, and the information associated with the one or more beams or the information associated with the one or more PL reference signals is to be used for a second cell that has been selected for serving the UE.

Aspect 23: The method of aspect 22, wherein the information associated with the one or more beams or the information associated with the one or more PL reference signals is to be used by the second cell based at least in part on the first cell and the second cell being included on a same cell list.

Aspect 24: The method of aspect 23, wherein the cell list is one of a set of cell lists that is pre-configured on the UE.

Aspect 25: The method of aspect 22, wherein a cell list identifying the first cell and the second cell is provided to the UE via at least one of: the joint indication, downlink control information, or a medium access control control element.

Aspect 26: The method of aspect 22, wherein a cell group identifier of a cell group including the first cell and the second cell is provided to the UE via at least one of: the joint indication, downlink control information, or a medium access control control element.

Aspect 27: The method of aspect 22, wherein the second cell is identified based at least in part on a UE capability indicating whether the UE supports cells in which a frequency range is permitted to share a same beam or a same PL reference signal.

Aspect 28: A method of wireless communication performed by a user equipment (UE), comprising: receiving a joint indication from a base station, the joint indication including information associated with: a cell that has been selected for serving the UE, one or more beams to be used for the cell, or one or more path loss (PL) reference signals to be used for the one or more beams; and communicating in the cell based at least in part on the joint indication.

Aspect 29: The method of aspect 28, wherein the joint indication is received via downlink control information.

Aspect 30: The method of any of aspects 28-29, wherein the joint indication is received via a medium access control control element.

Aspect 31: The method of any of aspects 28-30, wherein the information associated with the cell includes information identifying the cell.

Aspect 32: The method of aspect 31, wherein the information identifying the cell includes a physical cell identifier or a serving cell identifier.

Aspect 33: The method of any of aspects 28-32, wherein the one or more beams include a downlink beam indicated by an activated transmission configuration indicator (TCI) state identifier.

Aspect 34: The method of aspect 33, wherein the downlink beam is to be used for a physical downlink control channel, and the activated TCI state identifier is associated with a control resource set identifier.

Aspect 35: The method of aspect 33, wherein the downlink beam is to be used for a physical downlink shared channel.

Aspect 36: The method of aspect 33, wherein the downlink beam is to be used for a default physical downlink shared channel (PDSCH) to be used when a scheduling offset between downlink control information and a scheduled PDSCH is less than a beam switch latency threshold.

Aspect 37: The method of any of aspects 28-36, wherein the one or more beams include an uplink beam indicated by activated spatial relation information associated with an uplink resource.

Aspect 38: The method of aspect 37, wherein the uplink beam is to be used for a physical uplink control channel or a sounding reference signal.

Aspect 39: The method of any of aspects 28-38, wherein the one or more beams include an uplink beam indicated by an activated uplink transmission configuration indicator state identifier.

Aspect 40: The method of aspect 39, wherein the uplink beam is to be used for a physical uplink control channel, a sounding reference signal, a physical uplink shared channel, or a physical random access channel.

Aspect 41: The method of any of aspects 28-40, wherein the information associated with the one or more PL reference signals includes at least one PL reference signal identifier.

Aspect 42: The method of aspect 41, wherein the at least one PL reference signal identifier is indicated together with the one or more beams beam associated with a resource.

Aspect 43: The method of aspect 42, wherein the resource includes at least one among a physical uplink control channel, a sounding reference signal, a physical uplink shared channel, or a physical random access channel.

Aspect 44: The method of aspect 43, wherein the one or more beams are provided by one among a sounding reference signal resource indicator or an activated uplink transmission configuration indicator state identifier.

Aspect 45: The method of any of aspects 28-44, wherein PL reference signal identifiers associated with the one or more PL reference signals are indicated per physical uplink control channel resource identifier.

Aspect 46: The method of any of aspects 28-45, wherein PL reference signal identifiers associated with the one or more PL reference signals are indicated per sounding reference signal resource set identifier.

Aspect 47: The method of any of aspects 28-46, wherein PL reference signal identifiers associated with the one or more PL reference signals are indicated per physical uplink shared channel transmission.

Aspect 48: The method of any of aspects 28-47, wherein PL reference signal identifiers associated with the one or more PL reference signals are indicated per sounding reference signal resource indicator.

Aspect 49: The method of any of aspects 28-48, wherein the cell is a first cell, and the information associated with the one or more beams or the information associated with the one or more PL reference signals is to be used for a second cell that has been selected for serving the UE.

Aspect 50: The method of aspect 49, wherein the information associated with the one or more beams or the information associated with the one or more PL reference signals is to be used by the second cell based at least in part on the first cell and the second cell being included on a same cell list.

Aspect 51: The method of aspect 50, wherein the cell list is one of a set of cell lists that is pre-configured on the UE.

Aspect 52: The method of aspect 49, wherein a cell list identifying the first cell and the second cell is received from the base station via at least one of: the joint indication, downlink control information, or a medium access control control element.

Aspect 53: The method of aspect 49, wherein a cell group identifier of a cell group including the first cell and the second cell is received from the base station via at least one of: the joint indication, downlink control information, or a medium access control control element.

Aspect 54: The method of aspect 49, wherein the second cell is identified based at least in part on a UE capability indicating whether the UE supports cells in which a frequency range is permitted to share a same beam or a same PL reference signal.

Aspect 55: An apparatus for wireless communication at a device, comprising a processor; memory coupled with the processor; and instructions stored in the memory and executable by the processor to cause the apparatus to perform the method of one or more aspects of aspects 1-27.

Aspect 56: A device for wireless communication, comprising a memory and one or more processors coupled to the memory, the memory and the one or more processors configured to perform the method of one or more aspects of aspects 1-27.

Aspect 57: An apparatus for wireless communication, comprising at least one means for performing the method of one or more aspects of aspects 1-27.

Aspect 58: A non-transitory computer-readable medium storing code for wireless communication, the code comprising instructions executable by a processor to perform the method of one or more aspects of aspects 1-27.

Aspect 59: A non-transitory computer-readable medium storing a set of instructions for wireless communication, the set of instructions comprising one or more instructions that, when executed by one or more processors of a device, cause the device to perform the method of one or more aspects of aspects 1-27.

Aspect 60: An apparatus for wireless communication at a device, comprising a processor; memory coupled with the processor; and instructions stored in the memory and executable by the processor to cause the apparatus to perform the method of one or more aspects of aspects 28-54.

Aspect 61: A device for wireless communication, comprising a memory and one or more processors coupled to the memory, the memory and the one or more processors configured to perform the method of one or more aspects of aspects 28-54.

Aspect 62: An apparatus for wireless communication, comprising at least one means for performing the method of one or more aspects of aspects 28-54.

Aspect 63: A non-transitory computer-readable medium storing code for wireless communication, the code comprising instructions executable by a processor to perform the method of one or more aspects of aspects 28-54.

Aspect 64: A non-transitory computer-readable medium storing a set of instructions for wireless communication, the set of instructions comprising one or more instructions that, when executed by one or more processors of a device, cause the device to perform the method of one or more aspects of aspects 28-54.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
   identifying a first cell that has been selected for serving a user equipment (UE); and
   providing a joint indication to the UE, the joint indication indicating:
      information associated with the first cell that has been selected for serving the UE,
      information associated with one or more beams to be used for the first cell, and
      one or more path loss (PL) reference signal identifiers to be used for the one or more beams,
         wherein the one or more PL reference signal identifiers are to be used by a second cell based at least in part on the first cell and the second cell being included on a same cell list.

2. The method of claim 1, wherein the joint indication is provided via downlink control information.

3. The method of claim 1, wherein the joint indication is provided via a medium access control control element.

4. The method of claim 1, wherein the information associated with the first cell includes information identifying the first cell.

5. The method of claim 4, wherein the information identifying the first cell includes a physical cell identifier or a serving cell identifier.

6. The method of claim 1, wherein the one or more beams include a downlink beam indicated by an activated transmission configuration indicator (TCI) state identifier.

7. The method of claim 6, wherein the downlink beam is to be used for a physical downlink control channel, and the activated TCI state identifier is associated with a control resource set identifier.

8. The method of claim 6, wherein the downlink beam is to be used for a physical downlink shared channel.

9. The method of claim 6, wherein the downlink beam is to be used for a default physical downlink shared channel (PDSCH) to be used when a scheduling offset between downlink control information and a scheduled PDSCH is less than a beam switch latency threshold.

10. The method of claim 1, wherein the one or more beams include an uplink beam indicated by activated spatial relation information associated with an uplink resource.

11. The method of claim 10, wherein the uplink beam is to be used for a physical uplink control channel or a sounding reference signal.

12. The method of claim 1, wherein the one or more beams include an uplink beam indicated by an activated uplink transmission configuration indicator state identifier.

13. The method of claim 12, wherein the uplink beam is to be used for a physical uplink control channel, a sounding reference signal, a physical uplink shared channel, or a physical random access channel.

14. The method of claim 1, wherein the one or more PL reference signal identifiers are indicated together with the one or more beams associated with a resource.

15. The method of claim 14, wherein the resource includes at least one among a physical uplink control channel, a sounding reference signal, a physical uplink shared channel, or a physical random access channel.

16. The method of claim 15, wherein the one or more beams are provided by a sounding reference signal resource indicator or an activated uplink transmission configuration indicator state identifier.

17. The method of claim 1, wherein the one or more PL reference signal identifiers are indicated at least one of:

per physical uplink control channel resource identifier,
per sounding reference signal resource set identifier,
per physical uplink shared channel transmission, or
per sounding reference signal resource indicator.

18. The method of claim 1, wherein the information associated with the one or more beams or the one or more PL reference signal identifiers is to be used for the second cell based at least in part on the second cell being selected for serving the UE.

19. The method of claim 18, wherein a cell group identifier of a cell group including the first cell and the second cell is provided to the UE via at least one of:
the joint indication,
downlink control information, or
a medium access control control element.

20. The method of claim 18, wherein the second cell is identified based at least in part on a UE capability indicating whether the UE supports cells in which a frequency range is permitted to share a same beam or a same PL reference signal.

21. The method of claim 1, wherein the information associated with the one or more beams is to be used by the second cell based at least in part on the first cell and the second cell being included on the same cell list.

22. The method of claim 21, wherein the same cell list is one of a set of cell lists that is pre-configured on the UE.

23. The method of claim 21, wherein the same cell list is provided to the UE via at least one of:
the joint indication,
downlink control information, or
a medium access control control element.

24. A method of wireless communication performed by a user equipment (UE), comprising:
receiving a joint indication from a network entity, the joint indication indicating:
information associated with a first cell that has been selected for serving the UE,
information associated with one or more beams to be used for the first cell, and
one or more path loss (PL) reference signal identifiers to be used for the one or more beams,
wherein the one or more PL reference signal identifiers are to be used by a second cell based at least in part on the first cell and the second cell being included on a same cell list; and
communicating in the first cell based at least in part on the joint indication.

25. The method of claim 24, wherein the one or more beams include a downlink beam indicated by an activated transmission configuration indicator (TCI) state identifier.

26. The method of claim 24, wherein the one or more beams include an uplink beam indicated by activated spatial relation information associated with an uplink resource or by an activated uplink transmission configuration indicator state identifier.

27. The method of claim 24, wherein the one or more PL reference signal identifiers are indicated at least one of:
per physical uplink control channel resource identifier,
per sounding reference signal resource set identifier,
per physical uplink shared channel transmission, or
per sounding reference signal resource indicator.

28. A network entity for wireless communication, comprising:
a memory; and
one or more processors coupled to the memory, the one or more processors configured to:
identify a first cell that has been selected for serving a user equipment (UE); and
provide a joint indication to the UE, the joint indication indicating:
information associated with the first cell that has been selected for serving the UE,
information associated with one or more beams to be used for the first cell, and
one or more path loss (PL) reference signal identifiers to be used for the one or more beams,
wherein the one or more PL reference signal identifiers are to be used by a second cell based at least in part on the first cell and the second cell being included on a same cell list.

29. A user equipment (UE) for wireless communication, comprising:
a memory; and
one or more processors coupled to the memory, the one or more processors configured to:
receive a joint indication from a network entity, the joint indication indicating:
information associated with a first cell that has been selected for serving the UE,
information associated with one or more beams to be used for the first cell, and
one or more path loss (PL) reference signal identifiers to be used for the one or more beams,
wherein the one or more PL reference signal identifiers are to be used by a second cell based at least in part on the first cell and the second cell being included on a same cell list; and
communicate in the first cell based at least in part on the joint indication.

30. The UE of claim 29, wherein the joint indication is received via downlink control information.

31. The UE of claim 29, wherein the information associated with the first cell includes information identifying the first cell.

32. The UE of claim 31, wherein the information identifying the first cell includes a physical cell identifier or a serving cell identifier.

33. The UE of claim 29, wherein the one or more beams include a downlink beam indicated by an activated transmission configuration indicator (TCI) state identifier.

34. The UE of claim 29, wherein the information associated with the one or more beams is to be used by the second cell based at least in part on the first cell and the second cell being included on the same cell list.

* * * * *